United States Patent
Lee

(10) Patent No.: US 8,385,902 B2
(45) Date of Patent: Feb. 26, 2013

(54) SYSTEM AND METHOD FOR REMOTELY OPERATING A WIRELESS DEVICE USING A SERVER AND CLIENT ARCHITECTURE

(75) Inventor: Kwang Wee Lee, Singapore (SG)

(73) Assignee: Cassis International Pte Ltd., Singapore (SG)

( * ) Notice: Subject to any disclaimer, the term of this patent is extended or adjusted under 35 U.S.C. 154(b) by 0 days.

(21) Appl. No.: 13/596,622

(22) Filed: Aug. 28, 2012

(65) Prior Publication Data

US 2012/0324133 A1    Dec. 20, 2012

Related U.S. Application Data

(62) Division of application No. 12/386,213, filed on Apr. 14, 2009, now Pat. No. 8,254,903.

(51) Int. Cl.
*H04M 3/00* (2006.01)
(52) U.S. Cl. .......... 455/419; 455/420; 455/550.1; 455/557; 703/24; 709/203
(58) Field of Classification Search .......... 455/418–420, 455/41.2, 552.1, 556.1–558; 709/203–206
See application file for complete search history.

(56) References Cited

U.S. PATENT DOCUMENTS

| | | | | |
|---|---|---|---|---|
| 6,799,155 B1 * | 9/2004 | Lindemann et al. | ............ | 703/24 |
| 7,277,700 B2 * | 10/2007 | El Husseini et al. | .......... | 455/423 |
| 7,502,729 B2 * | 3/2009 | Dayar et al. | .................... | 703/27 |
| 7,925,250 B2 * | 4/2011 | Redpath | ........................ | 455/420 |
| 7,974,829 B2 * | 7/2011 | Ko | ................................ | 703/24 |
| 8,060,074 B2 * | 11/2011 | Danford et al. | ............... | 455/419 |
| 8,145,916 B2 * | 3/2012 | Boshra et al. | ................. | 713/186 |
| 8,254,903 B2 * | 8/2012 | Lee | ............................... | 455/419 |

* cited by examiner

*Primary Examiner* — Sharad Rampuria
(74) *Attorney, Agent, or Firm* — James R. Klaiber; Pryor Cashman LLP

(57) ABSTRACT

The present disclosure relates to a system and method for remotely operating one or more peripheral devices of a wireless device using a server and client architecture. In one aspect, the system may comprise a wireless device that includes a processor, a memory, a peripheral device, and a server adapted to communicate with the peripheral device; and a removable media device that includes a memory, a processor, and a client adapted to communicate with the server of the wireless device. In another aspect, the method may comprise the steps of emulating a hardware interface on a removable media device; mapping a peripheral device of a wireless device to the interface; mapping a processor of the media device to the peripheral device; wrapping and sending hardware commands from a client of the media device to a server of the wireless device; and executing the commands on the peripheral device.

113 Claims, 5 Drawing Sheets

SYSTEM AND METHOD FOR REMOTELY OPERATING A WIRELESS DEVICE USING A SERVER AND CLIENT ARCHITECTURE

CROSS-REFERENCE TO RELATED APPLICATIONS

This divisional application claims priority on prior filed U.S. non-provisional application Ser. No. 12/386,213 filed Apr. 14, 2009. All description, drawings and teachings set forth therein are expressly incorporated by reference herein and claim to priority upon the teachings expressly made herein.

This application claims priority to U.S. Provisional Patent Application Ser. Nos. 61/206,454, 61/206,453, and 61/206,427, filed Jan. 30, 2009, and U.S. Provisional Patent Application Ser. No. 61/206,797, filed Feb. 4, 2009, the disclosures of which are incorporated herein by reference.

FIELD OF THE INVENTION

The present invention relates to a system and method for operating the hardware of a wireless device from a remote media device using a server and client architecture.

BACKGROUND OF THE INVENTION

Current wireless device designs have all the software layers running on the handset main processor with the telephony hardware, radio hardware, Bluetooth, Audio Codec, WiFi, GPRS, display screen, camera hardware, and associated software applications. The application and the runtime environment are dependent on the particular handset hardware architecture. Accordingly, all applications and run-time environments of the device are likely not portable or compatible among devices with different hardware architectures.

SUMMARY OF THE INVENTION

Embodiments of the present invention include a system and method where the application software, runtime environment, telephony frameworks (including those for making calls and short messages), and embedded operating system of a wireless device may be controlled remotely from the device hardware via a high speed interface (including but not limited to USB or MMIC) from a removable media device which may be a system-on-chip in any form factor, including but not limited to an MMC, SD, micro SD, SIM, SAM, or USB dongle form factor.

In one embodiment, the system may comprise a wireless device that includes a processor, a memory, a peripheral device, and a server adapted to communicate with the peripheral device; and a removable media device that includes a memory, a processor, and a client adapted to communicate with the server of the wireless device. In another embodiment of the present invention, the method may comprise emulating a hardware interface on a removable media device; mapping a peripheral device of a wireless device to the interface; mapping a processor of the media device to the peripheral device; wrapping and sending hardware commands from a client of the media device to a server of the wireless device; and executing the commands on the peripheral device.

BRIEF DESCRIPTION OF THE DRAWINGS

Features and other aspects of the embodiments of the present invention are explained in the following description taken in conjunction with the accompanying drawings, wherein.

DETAILED DESCRIPTION

Figure 1:
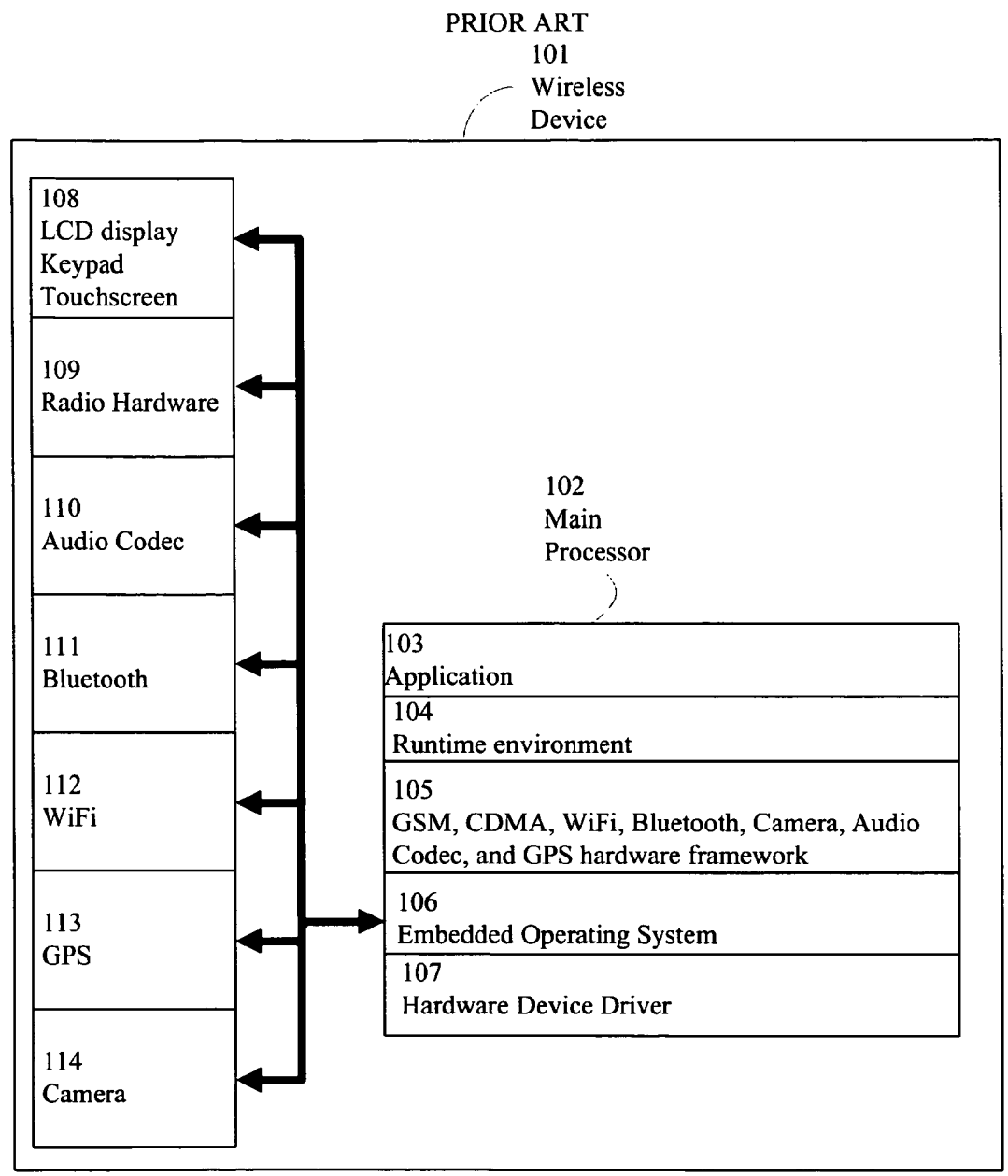
FIG. 1 illustrates a typical architecture for a wireless device with a processor co-located with the interface hardware.

FIG. 1 illustrates a typical architecture for a wireless device with a processor co-located with the interface hardware. As shown in FIG. 1, typical architecture for a wireless device includes a processor 102 located with the rest of the interface hardware in the wireless handset 101. The wireless device hardware may include one or more peripheral devices, including an LCD display, keypad, or touch screen 108; radio hardware 109 (GSM, CDMA, TD-SCDMA, etc.); an audio codec 110; Bluetooth 111; WiFi 112; GPS 113; and a camera 114, each connected to the main processor 102 through a hardware device driver 107. Additionally, the handset 101 may include a software application 103, a runtime environment 104, hardware framework 105, and an embedded operating system kernel 106.

Client-Server Architecture and Design

Figure 2:
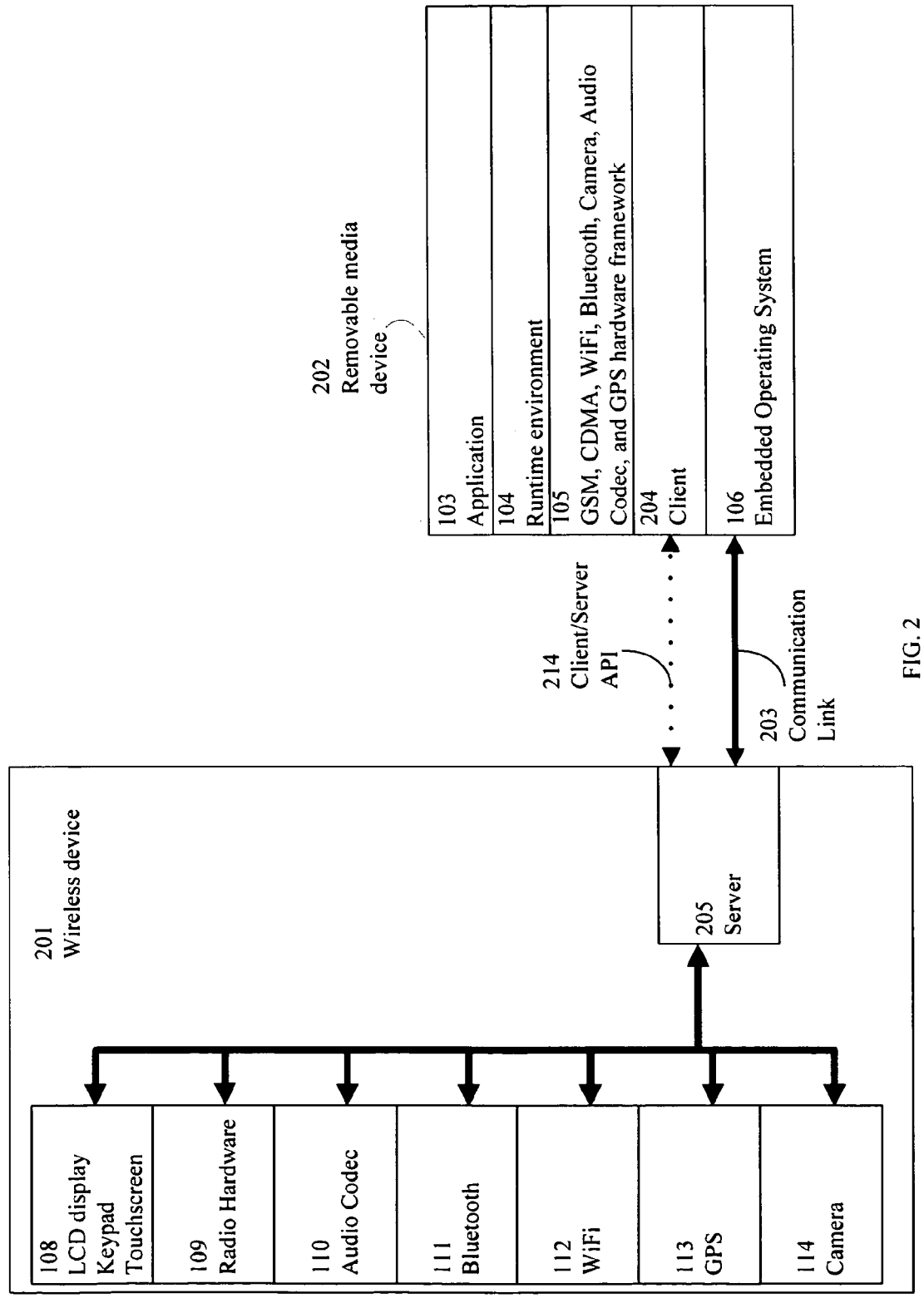
FIG. 2 illustrates a block diagram of an embodiment of the present invention showing a server in a wireless device and a client in a removable media device.

The remaining Figures may be used to illustrate embodiments of the present invention. As shown in FIG. 2, one embodiment of the present invention may include a wireless device 201 having a server 205 controlling peripheral device hardware 107-113, and a removable wireless device 202 that may include a client 204 containing the application 103, runtime environment 104, and embedded operating system 106. The server 205 of the removable media device 202 may be connected to and communicate with the client 204 of the wireless device or handset 201 via a communication link 203.

According to one aspect of the present invention, application 103 in the removable media device 202 may request a hardware resource through the hardware framework 105. In response, the client 204 may request that this resource be allocated to the server 205 on the wireless device 201. The server 205 may then virtually map the device hardware 107-113 on the wireless device 201 for the particular resource to the processor that is located in the removable media device 202.

By using the client/server architecture, the present invention may provide compatibility and increase the portability of a software application from one wireless device to another. The wireless device 201 does not require a sophisticated processor or complex software. Rather, the wireless device 201 may simply include drivers to manage its resources and communicate with the client 204 in the removable media device 202.

In one embodiment shown in FIG. 2, the server 205 and the client 204 may communicate with each other via a client-server application program interface ("API") 214. The API 214 at the server 205 may map the device resources to the applications 103 via the client 204. Whenever the client application 103 requests device resources, the application request is made via the API 114 to the server 205. This eliminates the dependency of the wireless device features and the wireless applications, and with the removable media, brings the additional benefits of application portability and security.

In one aspect, the hardware framework 105 of the removable media device 202 may be a library or collection of functions for a particular one or more of the hardware devices 107-113. Hardware device drivers may also be present on the removable media device 202. This aspect, however, is not necessary. The hardware framework 105 on the removable media device 202 may simply be associated with the client 204. That is, the actual drivers used to implement the hardware devices may be located in the wireless device 201. This configuration is discussed in greater detail below with reference to FIG. 5, which shows a wireless device 201 having hardware device drivers 413-415.

In one aspect, the client 204 of the removable media device in FIG. 2 may be a stub application. A stub may be a small software application. The server 205 of the wireless device 201 may also be a stub application. In another aspect, the communication link 203 may be a simple or high-speed bus, such as a USB. The communication link 203 may also be a wireless connection. Further aspects include but are not limited to USB, SD, micro SD, SIM, SAM, or MMC as a communication link 203.

An OpenMoko Neo Free Runner handset may be used for the wireless device 201, though any hardware configuration is possible. In other aspects, a Samsung S3C2443 development board may be used as the removable media device 202. Linux may be chosen as an open source operating system for the embedded operating system 106 in one embodiment of the present invention. Other operating systems available may include but are not limited or restricted to Win CE, Symbian, or any other embedded operating system. Another aspect may include incorporation of a graphic system (such as, for example, X-Window) that may run on embedded operating system kernel 106. Another aspect may include MatchBox as a runtime environment 104, but any runtime environment may be used, including Android, QT, MontaVista, and Openmoko.

Figure 3:
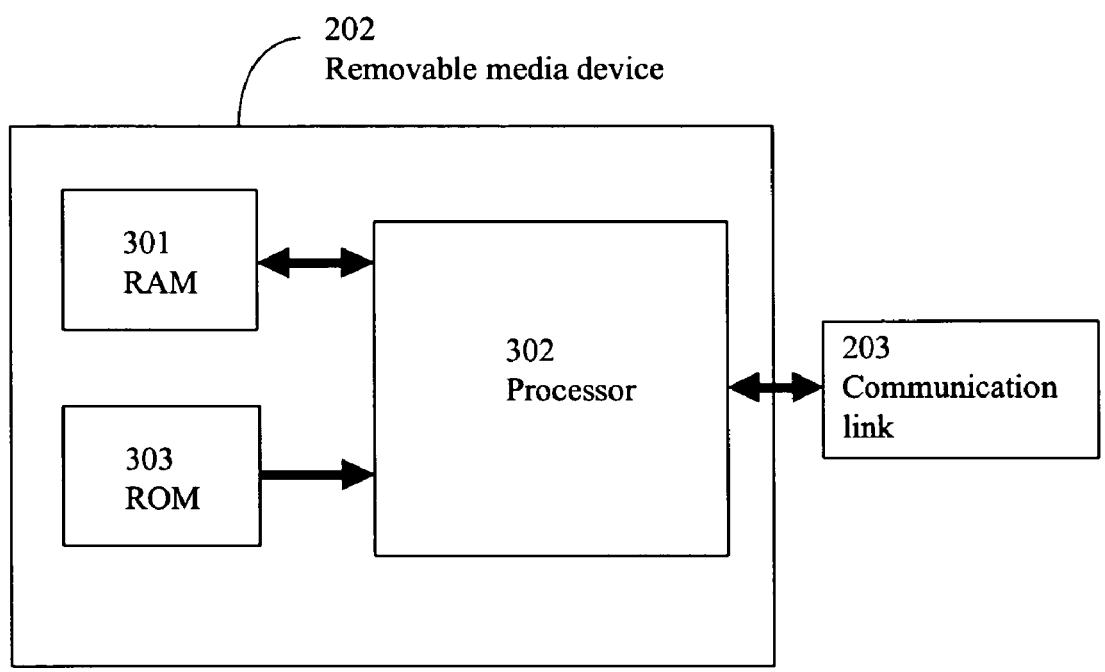
FIG. 3 illustrates a block diagram of the hardware design of the removable media device according to one embodiment of the present invention.

FIG. 3 illustrates a block diagram of the hardware design of the removable media device 202. As shown, removable media device 202 may include RAM 301, ROM 303, and processor 302. Removable media device 202 may be connected to a wireless device (such as wireless device 201 in FIG. 2) via communication link 203. The removable media device 202 may have any form factor including but not limited to MMC, SD, micro SD, SIM, SAM, or USB dongle.

Exchanging Data and Information

Figure 4:
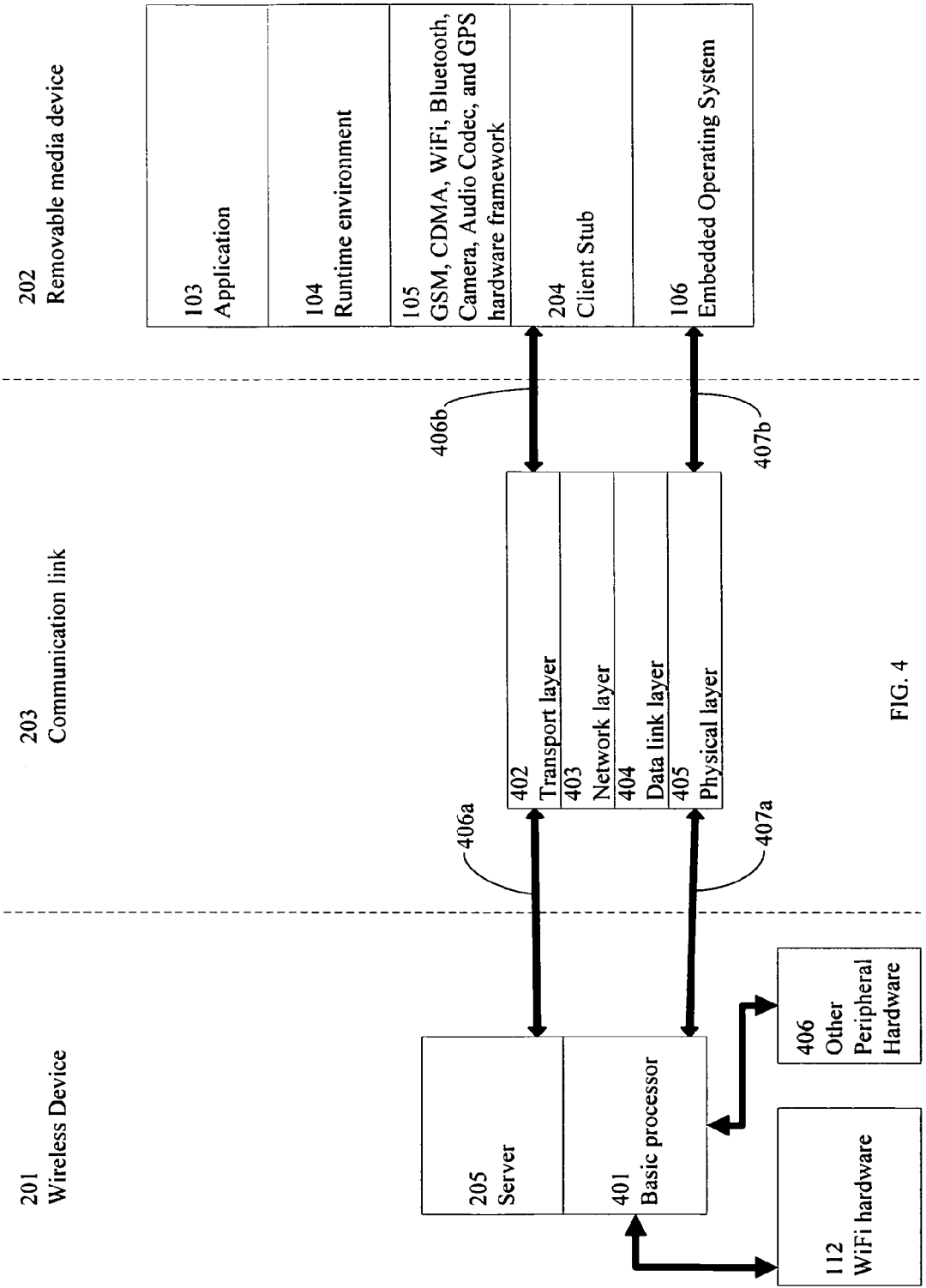
FIG. 4 illustrates a block diagram for the communication between the wireless device and a removable media device according to one embodiment of the present invention.

FIG. 4 shows the logical data exchange between the removable media device 202 and the wireless device 201 according to one embodiment of the present invention. The removable media device 202 and the wireless device 201 may communicate with one another using an Open Systems Interconnection Reference Model architecture, wherein the communication link 203 may include a transport layer 402, network layer 403, a data link layer 404, and a physical layer 405. For example, WiFi hardware 112 or hardware 406 associated with one or more other peripheral devices (e.g., LCD display, keypad or touch screen; radio hardware; an audio codec; Bluetooth; GPS; a camera; etc.) may be mapped to a client stub 204 in the removable media device 202 using a transport layer 402 of the communication link 203. In further aspects, interface 406b of the communication link 203 maps the client stub 204 to the transport layer 402, and interface 406a maps the transport layer 402 to the server 205. In another aspect, interface 407b maps the embedded operating system 106 to the physical layer 405, and interface 407a maps the physical layer 405 to a basic processor 401 of the wireless device 201.

In FIG. 4, the application process may start on the client side. The client application 103 may call a local client stub procedure instead of code implementing the procedure. Stubs may be compiled and linked with the client application 103 during development. Instead of containing code that implements the remote procedure, the client stub code may retrieve the required parameters from the calling application and wrap it as a TCP/IP packet and may deliver them to the communication link 203 that connects to the wireless device 201 containing the server 205.

In the wireless device 201, the server 205 may receive the parameters from the client, and the server 205 may call the server procedure. The server 205 may call the actual procedure on the server 205 with the parameters from the client. The remote procedure may then run, possibly generating output parameters and a return value. When the remote procedure is complete, a similar sequence of steps may return the data to the client stub 204. After the remote procedure returns its data to the server 205, the server may encapsulate output parameters to the format required for transmission back to the client. The server 205 may return the output parameter to the client stub 204 over the communication link 203. The client stub 204 may complete the process by accepting the data over the network and returning it to the calling function from application 103.

In further aspects, each hardware device (i.e., WiFi hardware 112 or other peripheral hardware 406) that is mapped may be assigned to a logical port through which it may communicate. The server 205 on the wireless device 201 may communicate the hardware configuration of a particular hardware device to the client stub 204 on the removable media device 202. The client stub 204 may assign a logical port to each hardware device reported by the server 205. The logical ports may start at 8889 and may decrement the port address for each next hardware device present on the wireless device 201. The client stub 204 may inform the server 205 of the hardware device logical port assignments.

In one aspect in particular, port 8889 may be assigned to map the WiFi hardware 112 from the wireless device 201 to the removable media device 202. When an application 103 or runtime environment 104 in the removable media device 202 requests a WiFi function, such as scanning for an access point, the client stub 204 sends this command via port 8889 to the server 205 in the wireless device 201. The server 205 may then instruct the WiFi hardware 112 to scan and return a list of access points found through the same logical port 8889. The client stub 204 may send the list of access points to the calling application 103 or runtime environment 104.

Accessing Peripheral Devices

Figure 5:
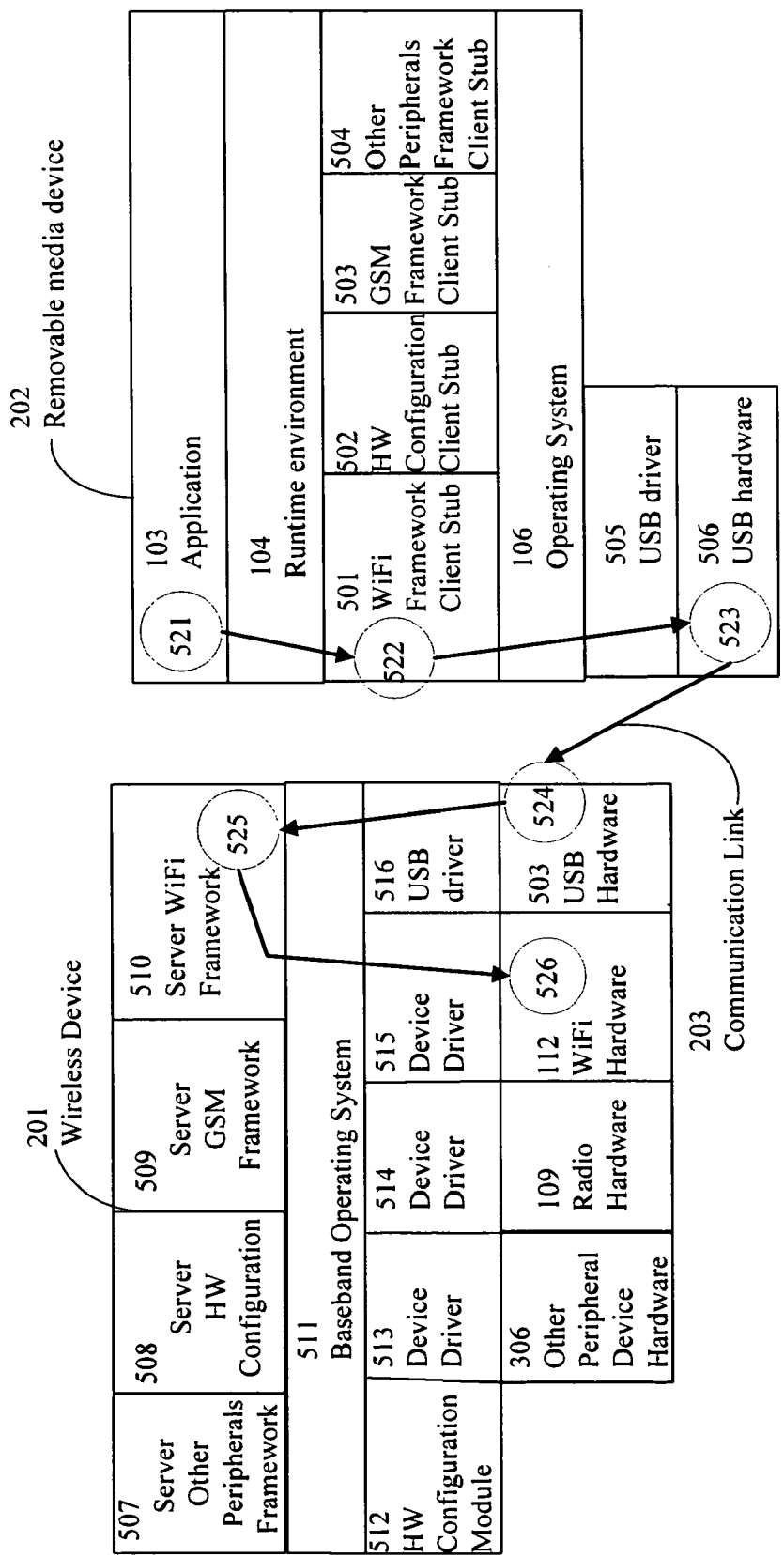
FIG. 5 illustrates a prototype implementation of the client and server according to one embodiment of the present invention.

FIG. 5 illustrates the flow of information from an application 103 that requests access to WiFi hardware 112 to scan for an access point. The information flow is depicted by the arrow in FIG. 5 in the sequence identified by the bubbles numbered 1 through 6. In this embodiment of the present invention, the wireless device 201 may include one or more hardware framework server stub applications 507-510 running on a baseband operating system 511 and hardware devices 306, 109, 112 driven by device drivers 413-415. The wireless device 201 may also include a hardware configuration module 512 for storing the configuration settings of the hardware devices 306, 109, and 112. The media device 202 may include one or more corresponding client stubs 501-504. The wireless device 201 and removable media device 202 may communicate with each other through communication link 203 via USB hardware 503, 506 driven by USB drivers 516, 505.

As shown in step 521, an application 103 may first issue a scan command to the WiFi hardware framework 105. In step 522, instead of the client stub WiFi framework 501 executing the procedures/codes to access the WiFi device hardware drivers—which may not be present on the removable media system—the client stub WiFi framework may encapsulate the parameters (command and data) into a TCP/IP packet and send it to the communication link 203 via the USB hardware 506. The command and data may be stored as the payload in the TCP/IP packet sent over the communication link 203.

Step 523 may involve the removable media device 202, which may be remotely connected to the wireless device 201 via USB CDC RNDIS/ethernet, functioning as though it is physically connected to the wireless device 201 and sending the TCP/IP packet to the wireless device 201 at a certain port number. This may be accomplished using a USB standard endpoint descriptor.

In step 524, the wireless device 201 may receive the packet and send it to the server stub WiFi framework 510 in the baseband processor of the wireless device. Each server hardware framework (e.g., 507-510) corresponding to a particular hardware device may have its own logical port on the TCP/IP network. The logical port may be dynamically assigned during start up. The servers 507-510 may inform the client stubs 501-504 of the hardware configuration present on the wireless device 201 and their corresponding logical port numbers. The ports may be assigned according to hardware type; for example, GSM may be 8889 and WiFi may be 8888.

The server 510 for the WiFi framework on the wireless device 201 may listen to TCP/IP at port number 8888, as shown in step 525. There may be a buffer for each logical port address on a transport layer (such as transport layer 402 shown in FIG. 4). The server 510 may check the buffer of a logical port address to determine if there is any data present. Once the packet is received, it may remove the encapsulation from the packet. For a framework call, the server 510 may implement the framework to call the WiFi hardware 112. A framework may be a library of functions that implement hardware functionality, for instance, having the WiFi hardware 112 scan for an access point.

Finally, in step 526, the command may be received by the WiFi hardware 112 and executed. A result may be returned to the calling application 103 through the reverse order of information flow (i.e., from step 526 to step 525 . . . to step 521). A wireless device 201 may operate with the removable media device 202 as long as the server stub of server 510 may implement the parameters and API of the client stub 501, even if, for example, the configuration of the WiFi hardware 112 is different than the corresponding hardware configuration for the removable media device 202.

The advantages of embodiments of the present invention may include one or more of the following: (1) because the wireless device does not require high processing power, and may include only the server API, there may be significant product development cost savings and/or decreased time to market; (2) wireless applications may be portable from one wireless device to any such device that contains the server API, allowing more freedom for the consumers; and (3) service providers can ensure full portability of the user interface when the consumers change wireless devices because the user interface of the new wireless device can be programmed in the removable media device.

Although illustrative embodiments have been shown and described herein in detail, it should be noted and will be appreciated by those skilled in the art that there may be numerous variations and other embodiments that may be equivalent to those explicitly shown and described. For example, the scope of the present invention is not necessarily limited in all cases to execution of the aforementioned steps in the order discussed. Unless otherwise specifically stated, terms and expressions have been used herein as terms of description, not of limitation. Accordingly, the invention is not to be limited by the specific illustrated and described embodiments (or the terms or expressions used to describe them) but only by the scope of claims.

What is claimed is:

1. A system for operating one or more peripheral devices of a wireless device from a media device, the system comprising:
a wireless device, including:
a processor;
a memory coupled to said processor;
one or more peripheral devices adapted to run on said processor and memory; and
a first server adapted to run on said memory and said processor, wherein said first server is adapted to communicate with at least one of said peripheral devices and the media device;
wherein said first server and said processor are adapted to unwrap hardware commands, and
wherein said processor and said memory are adapted to communicate with said one or more peripheral devices.

2. The system of claim 1, wherein said first server is adapted to communicate with a client of the media device.

3. The system of claim 1 wherein said first server is a stub application.

4. The system of claim 1, wherein said first server is adapted to communicate with the media device using an API.

5. The system of claim 1, wherein said first server is adapted to communicate with the media device through a communication link.

6. The system of claim 5, wherein said communication link is a data bus.

7. The system of claim 5, wherein said communication link is wireless.

8. The system of claim 5, wherein said first server is adapted to communicate with the media device using a transport layer of said communication link.

9. The system of claim 8, wherein said wireless device is coupled to a buffer, said buffer adapted to store data transmitted from said transport layer.

10. The system of claim 5, wherein said processor is adapted to communicate with an embedded operating system of the media device using a physical layer of said communication link.

11. The system of claim 1, wherein at least one of said peripheral devices is a display screen, keypad, touch screen, radio, codec, Bluetooth adapter, WiFi adapter, GPS, or camera.

12. The system of claim 1, wherein said wireless device includes a second server, said second server adapted to run on said processor and adapted to communicate with another one of said peripheral devices and the media device.

13. The system of claim 12, wherein said first and second servers are identifiable by logical port number.

14. The system of claim 1, wherein said wireless device is a CDC RNDIS/Ethernet class USB device.

15. The system of claim 1, wherein said wireless device further includes a driver adapted to drive one or more of said peripheral devices.

16. The system of claim 1, wherein said wireless device further includes a hardware configuration module adapted to store data corresponding to one or more settings for at least one of said peripheral devices.

17. The system of claim 13, wherein at least one of said settings corresponds to one or more of thresholds, min values, max values, character case, language, sensitivity, frequency, channel, frame rate, resolution, color, bit rate, sample size, sampling rate, ISO, and power.

18. The system of claim 17, wherein said first server is adapted to transmit, to the media device, data corresponding to said settings to the media device.

19. The system of claim 1, wherein said first server is adapted to receive hardware commands from the media device, said hardware commands for executing on hardware of at least one of said peripheral devices.

20. The system of claim 19, wherein said first server is adapted to transmit results corresponding to said hardware commands to the media device.

21. A system for operating one or more peripheral devices of a wireless device from a media device, the system comprising:
a media device, including:
a first memory;
a processor coupled to said first memory; and
a first client adapted to run on said processor and first memory,
wherein said first client is adapted to communicate with one or more peripheral devices of the wireless device, and;
wherein said first client is adapted to emulate said one or more peripheral devices of the wireless device.

22. The system of claim 21, wherein at least one of the peripheral devices of the wireless device is a display screen, keypad, touch screen, radio, audio codec, Bluetooth, WiFi adapter, GPS, or camera.

23. The system of claim 21, further including hardware framework running on said processor, said hardware framework corresponding to one or more peripheral devices.

24. The system of claim 23, wherein said hardware framework includes a library of functions adapted to be implemented by at least one of the peripheral devices.

25. The system of claim 24, wherein at least one of the peripheral devices includes WiFi hardware and at least one of said functions includes having said WiFi hardware scan for an access point.

26. The system of claim 21, further including a second client, said second client adapted to run on said processor and adapted to communicate with another one of said peripheral devices of the wireless device.

27. The system of claim 21, wherein said media device is removably coupled to the wireless device.

28. The system of claim 21, wherein said media device is mechanically connected to the wireless device.

29. The system of claim 21, wherein said first client is a stub application.

30. The system of claim 21, wherein said first client is adapted to communicate with at least one of the peripheral devices of the wireless device using an API.

31. The system of claim 21, wherein said media device adheres to a MMC, SD, micro SD, SIM, SAM, or USB dongle form factor.

32. The system of claim 21, wherein said media device is a removable media card.

33. The system of claim 21, wherein said first memory is RAM.

34. The system of claim 33, wherein said media device includes a second memory, and wherein said second memory is ROM.

35. The system of claim 21, wherein said first client is adapted to communicate with one or more of the peripheral devices of the wireless device through a communication link.

36. The system of claim 35, wherein said communication link is a data bus.

37. The system of claim 35, wherein said communication link is wireless.

38. The system of claim 35, wherein said first client is adapted to communicate with the wireless device using a transport layer of said communication link.

39. The system of claim 21, wherein said processor is adapted to run an embedded operating system.

40. The system of claim 39, wherein said embedded operating system is Linux, Win CE, or Symbian.

41. The system of claim 40, wherein said embedded operating system is adapted to communicate with a processor of the wireless device using a physical layer of a communication link.

42. The system of claim 21, wherein said processor is adapted to run a graphics engine adapted to provide a graphical user interface.

43. The system of claim 42, wherein said graphics engine is X-Windows.

44. The system of claim 21, wherein said processor is adapted to run a runtime environment.

45. The system of claim 44, wherein said runtime environment is MatchBox, Android, QT, MontaVista, or Openmoko.

46. The system of claim 21, wherein said first client is adapted to communicate with a server of the wireless device.

47. The system of claim 46, wherein said first client is adapted to transmit hardware commands to said server, said hardware commands for executing on one or more of said peripheral devices.

48. The system of claim 47, wherein said first client is adapted to receive one or more results corresponding to said hardware commands from the wireless device.

49. The system of claim 47, wherein said hardware commands include one or more of querying configurable and non-configurable properties of at least one peripheral device of the wireless device, changing configuration settings for at least one peripheral device, checking configuration settings of at least one peripheral device, and sending data to at least one peripheral device for execution on hardware of the peripheral device.

50. The system of claim 21, wherein said first client is adapted to receive, from the wireless device, data corresponding to one or more settings for at least one peripheral device of the wireless device.

51. The system of claim 50, wherein said settings include a setting corresponding to one or more of thresholds, min values, max values, character case, language, sensitivity, frequency, channel, frame rate, resolution, color, bit rate, sample size, sampling rate, ISO, and power.

52. The system of claim 21, wherein said first client is adapted to communicate with the peripheral device of the wireless device by transmitting wrapped TCP/IP packets to the wireless device.

53. The system of claim 21, wherein said media device is adapted to communicate with the wireless device using an Open Systems Interconnection Reference Model architecture.

54. The system of claim 21, wherein said media device is adapted to communicate with the wireless device via a communication link having one or more protocol layers.

55. The system of claim 54, wherein said protocol layers include one or more of a transport layer, network layer, datalink layer, and physical layer.

56. A system for operating one or more peripheral devices of a wireless device from a media device, the system comprising:

a wireless device, including:
- a first processor;
- a first memory coupled to said first processor;
- one or more peripheral devices adapted to run on said first processor and first memory; and
- a first server adapted to run on said first memory and said first processor, wherein said first server is adapted to communicate with at least one of said peripheral devices;
- wherein said first server and said processor are adapted to unwrap hardware commands, and wherein said processor and said memory are adapted to communicate with said one or more peripheral devices; and a media device, including:
- a second memory;
- a second processor coupled to said second memory; and
- a first client adapted to run on said second processor and second memory, wherein said first client is adapted to communicate with said first server of said wireless device, and said first server is adapted to communicate with said first client of said media device;
- wherein said first client is adapted to emulate said one or more peripheral devices of the wireless device.

57. The system of claim 56, wherein said first server is a stub application.

58. The system of claim 56, wherein said first client is a stub application.

59. The system of claim 56, wherein said first server is adapted to communicate with said first client using an API.

60. The system of claim 56, wherein said first client is adapted to communicate with said first server using a communication link.

61. The system of claim 60, wherein said communication link is a data bus.

62. The system of claim 60, wherein said communication link is wireless.

63. The system of claim 56, wherein at least one of said peripheral devices is a display screen, codec, GPS, or camera.

64. The system of claim 56, wherein at least one of said first peripheral devices includes radio hardware for receiving and transmitting radio signals.

65. The system of claim 64, wherein said radio hardware is adapted to receive or transmit one or more of CDMA, GPRS, GSM, Bluetooth, and Wi-Fi signals.

66. The system of claim 56, wherein at least one of said peripheral devices is adapted to receive input from a user.

67. The system of claim 66, wherein at least one of said peripheral devices is a keypad, joystick, push button, touch screen, or keyboard.

68. The system of claim 56, wherein said wireless device includes a second server, said second server adapted to run on said first processor and adapted to communicate with another one of said peripheral devices.

69. The system of claim 68, wherein said first and second servers are identifiable by logical port number.

70. The system of claim 68, wherein said media device includes a second client, said second client adapted to run on said second processor, and wherein said second client is adapted to communicate with said second server of said wireless device, and said second server is adapted to communicate with said second client of said media device.

71. The system of claim 56, wherein said wireless device is a CDC RNDIS/Ethernet class USB device.

72. The system of claim 56, wherein said wireless device further includes a driver adapted to drive one or more of said peripheral devices.

73. The system of claim 56, wherein said wireless device further includes a hardware configuration module adapted to store data corresponding to one or more settings for said first peripheral device.

74. The system of claim 73, wherein at least one of said settings corresponds to one or more of thresholds, min values, max values, character case, language, sensitivity, frequency, channel, frame rate, resolution, color, bit rate, sample size, sampling rate, ISO, and power.

75. The system of claim 56, further including hardware framework running on said second processor, said hardware framework corresponding to one or more peripheral devices.

76. The system of claim 75, wherein said hardware framework includes a library of functions adapted to be implemented by at least one of the peripheral devices.

77. The system of claim 76, wherein at least one of said peripheral devices includes WiFi hardware and at least one of said functions includes having said WiFi hardware scan for an access point.

78. The system of claim 56, wherein said media device is removably coupled to the wireless device.

79. The system of claim 56, wherein said media device is mechanically connected to the wireless device.

80. The system of claim 56, wherein said media device adheres to a MMC, SD, micro SD, SIM, SAM, or USB dongle form factor.

81. The system of claim 56, wherein said media device is a removable media card.

82. The system of claim 56, wherein said first memory is RAM.

83. The system of claim 56, wherein said media device further includes a third memory, and wherein said third memory is ROM.

84. The system of claim 56, wherein said first client is adapted to communicate with said first server using a transport layer of a communication link.

85. The system of claim 84, wherein said wireless device is coupled to a buffer, said buffer adapted to store data transmitted from said transport layer.

86. The system of claim 56, wherein said second processor is adapted to run an embedded operating system.

87. The system of claim 86, wherein said embedded operating system is adapted to communicate with said first processor of the wireless device using a physical layer of a communication link.

88. The system of claim 86, wherein said embedded operating system is Linux, Win CE, or Symbian.

89. The system of claim 56, wherein said second processor is adapted to run a graphics engine adapted to provide a graphical user interface.

90. The system of claim 89, wherein said graphics engine is X-Windows.

91. The system of claim 56, wherein said processor is adapted to run a runtime environment.

92. The system of claim 91, wherein said runtime environment is MatchBox, Android, QT, MontaVista, or Openmoko.

93. The system of claim 56, wherein said first client is adapted to transmit hardware commands to said first server, said hardware commands for executing by hardware of one or more of said peripheral devices.

94. The system of claim 93, wherein said first client is adapted to receive one or more results corresponding to said hardware commands from said first server.

95. The system of claim 56, wherein said first client is adapted to receive, from said first server, data corresponding to one or more settings for at least one peripheral device of said wireless device.

96. The system of claim 95, wherein said settings include a setting corresponding to one or more of thresholds, min values, max values, character case, language, sensitivity, frequency, channel, frame rate, resolution, color, bit rate, sample size, sampling rate, ISO, and power.

97. The system of claim 56, wherein said first client is adapted to communicate with said first server by transmitting wrapped TCP/IP packets to the wireless device.

98. The system of claim 56, wherein said media device is adapted to communicate with said wireless device using a communication link having one or more protocol layers.

99. The system of claim 98, wherein said protocol layers include one or more of a transport layer, network layer, datalink layer, and physical layer.

100. The system of claim 56, wherein said media device is adapted to communicate with said wireless device using an Open Systems Interconnection Reference Model architecture.

101. The system of claim 56, wherein said first memory is a buffer memory.

102. The system of claim 56, wherein said wireless device is a cellular telephone.

103. The system of claim 102, wherein said cellular telephone is an OpenMoko Neo FreeRunner.

104. The system of claim 56, wherein said first processor is a baseband processor.

105. A system for operating one or more peripheral devices of a wireless device from a media device, the system comprising:
  a wireless device, including:
    a means for processing;
    a means for storing coupled to said means for processing;
    a means for executing data using hardware adapted to run on said means for storing and said means for processing; and
    a means for unwrapping hardware commands adapted to run on said means for storing and said means for processing, wherein said means for unwrapping hardware commands is adapted to communicate with said media device and said means for executing data.

106. A system for operating one or more peripheral devices of a wireless device from a media device, the system comprising:
  a media device, including:
    a means for processing;
    a means for storing coupled to said means for processing; and
    a means for emulating a peripheral device adapted to run on said means for storing and said means for processing, wherein said means for emulating a peripheral device is adapted to communicate with one or more peripheral devices of the wireless device.

107. The system of claim 106, wherein said media device is removably coupled to the wireless device.

108. The system of claim 106, wherein said media device is mechanically connected to the wireless device.

109. The system of claim 106, wherein said media device adheres to a MMC, SD, micro SD, SIM, SAM, or USB dongle form factor.

110. A system for operating one or more peripheral devices of a wireless device from a media device, the system comprising:
  a wireless device, including:
    a first means for processing;
    a first means for storing coupled to said first means for processing;
    a means for executing data using hardware coupled to said first processing means; and
    a means for unwrapping hardware commands adapted to run on said first storing means and said first processing means, wherein said means for unwrapping hardware commands is adapted to communicate with said means for executing data;
  a media device, including:
    a second means for processing;
    a second means for storing coupled to said second means for processing; and
    a means for emulating said means for executing data adapted to run on said second storing means and said second processing means, wherein said means for unwrapping hardware commands of the wireless device is adapted to communicate with said means for emulating of the media device, and said means for emulating is adapted to communicate with said means for unwrapping hardware commands.

111. The system of claim 110, wherein said media device is removably coupled to said wireless device.

112. The system of claim 110, wherein said media device is mechanically connected to said wireless device.

113. The system of claim 110, wherein said media device adheres to a MMC, SD, micro SD, SIM, SAM, or USB dongle form factor.

\* \* \* \* \*